United States Patent
Waters et al.

(10) Patent No.: US 9,875,773 B1
(45) Date of Patent: Jan. 23, 2018

(54) ACOUSTIC HARD DRIVE SURROGATE

(71) Applicant: Dell Products, L.P., Round Rock, TX (US)

(72) Inventors: Paul Allen Waters, Austin, TX (US); Ryan Scott Signer, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 15/588,141

(22) Filed: May 5, 2017

(51) Int. Cl.
*G11B 33/14* (2006.01)
*G11B 33/06* (2006.01)
*G11B 33/08* (2006.01)
*G11B 33/12* (2006.01)
*G06F 1/16* (2006.01)
*G11B 33/10* (2006.01)

(52) U.S. Cl.
CPC .......... *G11B 33/06* (2013.01); *G06F 1/1656* (2013.01); *G11B 33/08* (2013.01); *G11B 33/10* (2013.01); *G11B 33/122* (2013.01); *G11B 33/124* (2013.01); *G11B 33/142* (2013.01)

(58) Field of Classification Search
CPC ...... G11B 33/10; G11B 33/142; G06F 1/1656
USPC ......... 360/97.13, 97.19; 361/679.33, 679.46, 361/679.48
See application file for complete search history.

(56) References Cited

U.S. PATENT DOCUMENTS

| | | | | |
|---|---|---|---|---|
| 8,645,308 B2* | 2/2014 | Furuya | ............... | G10K 11/16 706/52 |
| 8,681,440 B1* | 3/2014 | Theimer | ............... | G11B 5/012 360/39 |
| 9,036,291 B1* | 5/2015 | Nava | ............... | G11B 5/59694 360/69 |
| 2003/0123675 A1* | 7/2003 | Culman | ............... | G10K 11/1788 381/71.1 |
| 2005/0078835 A1* | 4/2005 | Baugh | ............... | G11B 25/043 381/61 |
| 2007/0253157 A1* | 11/2007 | Atkins | ............... | G06F 1/184 361/679.33 |
| 2007/0268791 A1* | 11/2007 | Grow | ............... | G11B 15/689 369/30.64 |
| 2009/0013789 A1* | 1/2009 | Popescu | ............... | G01H 1/12 73/649 |
| 2010/0252358 A1* | 10/2010 | Rodrigues | ............... | G06F 1/20 181/206 |
| 2014/0149785 A1* | 5/2014 | Bunker | ............... | G06F 13/14 714/6.2 |

* cited by examiner

*Primary Examiner* — Jefferson Evans
(74) *Attorney, Agent, or Firm* — Fogarty LLP (57) ABSTRACT

Systems and methods for an acoustic hard drive surrogate. In some embodiments, an Information Handling System (IHS) may include a chassis having a hard drive bay, and an acoustic hard drive surrogate coupled to the hard drive bay, where the acoustic hard drive surrogate includes a microphone configured to measure a combined airflow-induced and fan-generated acoustic wave transmitted over the air within the chassis and received at a selected point on a surface of the acoustic hard drive surrogate, and where the measurement excludes vibration received by the acoustic hard drive surrogate through the chassis.

20 Claims, 7 Drawing Sheets

ACOUSTIC HARD DRIVE SURROGATE

FIELD

The present disclosure generally relates to Information Handling Systems (IHSs), and, more particularly, to an acoustic hard drive surrogate.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes.

Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use, such as financial transaction processing, airline reservations, enterprise data storage, global communications, etc.

In addition, IHSs may include a variety of hardware and software components that may be configured to process, store, and communicate information; and may include one or more computer systems, data storage systems, and/or networking systems.

When designing an IHS with high technology density—that is, an IHS having a large number of CPU transistors, resistors, ICs, expander cards, hard drives, and/or other components deployed inside its chassis—it becomes necessary to manage the amount heat generated by each component to prevent damage or failure. A common solution is to increase the amount of air flowing through the chassis to reduce the temperature of those components, which often is accomplished using higher-speed (rpm) fans. However, the inventors hereof have recognized several disadvantages with these techniques, including, but note limited to: higher fan power consumption, larger fan-induced vibration, and higher acoustical output.

As an example, consider that spinning disk manufacturers generally look for ways to increase the storage capacity of their hard drives (e.g., measured in Gigabytes, Terabytes, etc.). As the inventors hereof have discovered, the increase in storage capacity has also led to an increase in sensitivity to acoustic excitation. In some cases, a hard drive's throughput may drop by as much as 50% due to fan and airflow acoustics around the hard drive alone, exclusively from any issues caused by fan-induced vibration carried through the IHS's chassis.

SUMMARY

Embodiments of systems and methods for an acoustic hard drive surrogate are described. In an illustrative, non-limiting embodiment, an Information Handling System (IHS) may comprise: a chassis having a hard drive bay; and an acoustic hard drive surrogate coupled to the hard drive bay, wherein the acoustic hard drive surrogate includes a microphone configured to measure a combined airflow-induced and fan-generated acoustic wave transmitted over the air within the chassis and received at a selected point on a surface of the acoustic hard drive surrogate, and wherein the measurement excludes vibration received by the acoustic hard drive surrogate through the chassis.

The surface may be a top surface of the acoustic hard drive surrogate parallel to a bottom surface, the selected point may be located at one of a plurality of circular openings on the top surface configured to have the microphone inserted therein, and a diaphragm of the microphone may be parallel to the top surface. Additionally or alternatively, surface may be a bottom surface of the acoustic hard drive surrogate parallel to a top surface, the selected point may be located at a single circular opening on the bottom surface configured to have the microphone inserted therein, and the diaphragm may be parallel to the bottom surface.

The acoustic hard drive surrogate may include a connector portion configured to mimic a connector of a hard drive, and the connector may block at least a portion of airflow between the acoustic hard drive surrogate and a Printed Circuit Board (PCB) within the IHS.

The microphone may be separated from a perimeter of the circular opening using a vibration damping component or shock mount. The acoustic hard drive surrogate may include a hollow body between the top and bottom surfaces configured to hold the microphone. The microphone may be mounted on a PCB, and the acoustic hard drive surrogate may include a motor coupled to the PCB and configured to move the microphone between different ones of the plurality of circular openings.

The PCB further comprises a controller coupled to the microphone, the controller configured to identify a fan speed at which the acoustic wave causes the acoustic hard drive surrogate to suffer performance degradation, and a fan within the IHS may be configured to avoid the identified fan speeds during operation of the IHS. Moreover, during a measurement of the acoustic wave, all circular openings other than the circular opening at the selected point may be covered.

In another illustrative, non-limiting embodiment, a method may implement one or more of the aforementioned techniques. In yet another illustrative, non-limiting embodiment, an acoustic hard drive surrogate may be to perform one or more of the aforementioned techniques.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

At the intersection of two technology challenges, acoustically sensitive hard drives and increasing fan speeds, is the Information Handling System (IHS) chassis. The hard drive bay area of the chassis is often confined and acts as a parallel path of small air ducts. The small size of these ducts and the complex sheet metal surfaces that make up the boundaries create a complex aero-acoustic environment, where turbulent airflow generates noise as both: (1) air propagates around the hard drive, and (2) fan-induced noise—i.e., noise generated by the fan blades moving air—propagates outwards from inside the chassis. These complex acoustic fields generate uneven acoustic pressure on the hard drives, which can in turn induce mechanical vibration substantial enough to dramatically reduce HDD throughput performance.

Generally, an IHS chassis may house any type of IHS, such as a server, a desktop, etc. In some embodiments, the IHS chassis may include an IHS that is capable of being mounted on a server rack. The IHS chassis may include multiple hard drive bays, and each bay may be capable of housing a removable hard drive. In some cases, a hard drive bay may also include an eject button or mechanism which, when activated, enables a hard drive housed within that bay to be ejected from the chassis.

The term "hard drive," as used herein, refers to any hardware data storage device that stores and retrieves digital information, at least in part, using one or more rotating disks (or platters), usually coated with magnetic material or the like. It should be noted, however, that other types of HHD exist that also include a stationary memory portion, such as a Solid State Drive (SSD), hybrid drives, etc.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
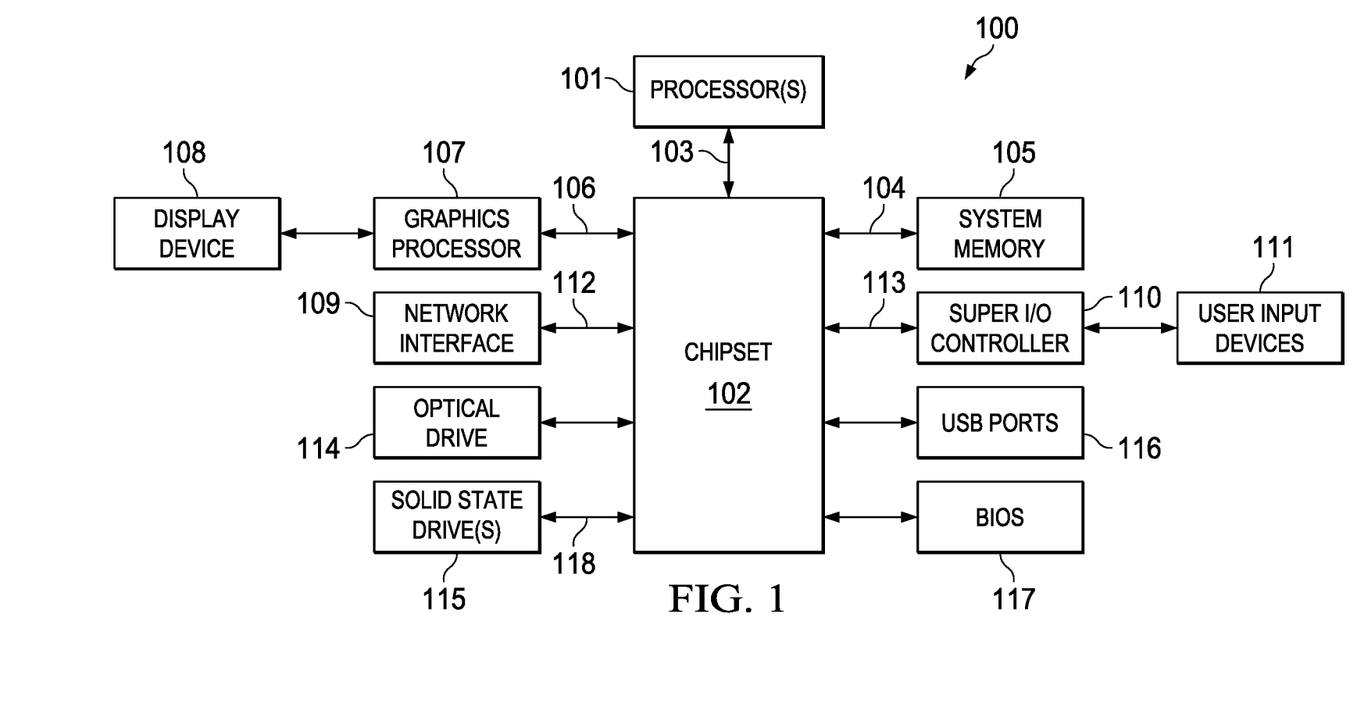
FIG. 1 is a diagram of an example of an Information Handling System (IHS) according to some embodiments.

FIG. 1 is a block diagram of IHS 100 configured according to certain embodiments. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes chipset 102 that may include one or more integrated circuits that are connect to processor(s) 101. In certain embodiments, chipset 102 may utilize a QPI (QuickPath Interconnect) bus 103 for communicating with the processor(s) 101. Chipset 102 provides the processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), dynamic RAM (DRAM) or nonvolatile/Flash-type memory.

Chipset 102 may also provide access to a graphics processor 107. In certain embodiments, graphics processor 107 may be comprised within one or more video or graphics cards that have been installed as components of the IHS 100. Graphics processor 107 may be coupled to the chipset 102 via a graphics bus 106 such as provided by an AGP (Accelerated Graphics Port) bus or a PCIe (Peripheral Component Interconnect Express) bus. In certain embodiments, a graphics processor 107 generates display signals and provides them to HMD device 100 (or any other display device 108).

In certain embodiments, chipset 102 may also provide access to one or more user input devices 111. In such embodiments, chipset 102 may be coupled to a super I/O controller 110 that provides interfaces for a variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. The I/O devices, such as may interface super I/O controller 110 through wired or wireless connections. In certain embodiments, chipset 102 may be coupled to the super I/O controller 110 via a Low Pin Count (LPC) bus 113.

Other resources may also be coupled to the processor(s) 101 of the IHS 100 through the chipset 102. In certain embodiments, chipset 102 may be coupled to a network interface 109, such as provided by a Network Interface Controller (NIC) that is coupled to the IHS 100. In certain embodiments, the network interface 109 may be coupled to the chipset 102 via a PCIe bus 112. According to various embodiments, network interface 109 may support communication via various wired and/or wireless networks. In certain embodiments, the chipset 102 may also provide access to one or more Universal Serial Bus (USB) ports 116.

Chipset 102 also provides access to one or more solid state storage devices 115. The chipset 102 utilizes a PCIe bus interface connection 118 in order to communication with the solid state storage device 115. In certain embodiments, chipset 102 may also provide access to other types of storage devices. For instance, in addition to the solid state storage device 115, an IHS 100 may also utilize one or more magnetic disk storage devices, or other types of the storage devices such as an optical drive or a removable-media drive. In various embodiments, the solid state storage device 115 may be integral to the IHS 100, or may be located remotely from the IHS 100.

Another resource that may be accessed by processor(s) 101 via chipset 102 is a BIOS (Basic Input/Output System) 117. As described in more detail below with respect to additional embodiments, upon powering or restarting IHS 100, processor(s) 101 may utilize BIOS 117 instructions to initialize and test hardware components coupled to the IHS 100 and to load an operating system for use by the IHS 100. The BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, IHS 100 may not include each of the components shown in FIG. 1. Additionally or alternatively, IHS 100 may include various components in addition to those that are shown in FIG. 1. Furthermore, some components that are represented as separate components in FIG. 1 may, in some embodiments, be integrated with other components. For example, in various implementations, all or a portion of the functionality provided by the illustrated components may instead be provided by components integrated into the one or more processor(s) 101 as a system-on-a-chip (SOC) or the like.

As such, FIG. 1 shows various internal components of an example IHS 100 configured to implement systems and methods described herein. It should be appreciated, however, that although IHS 100 is usually embodied as a laptop or other conventional computing device, other implementations may be utilized with various other types of information handling devices (e.g., smart phones, smart watches, tablets, etc.).

Figure 2:
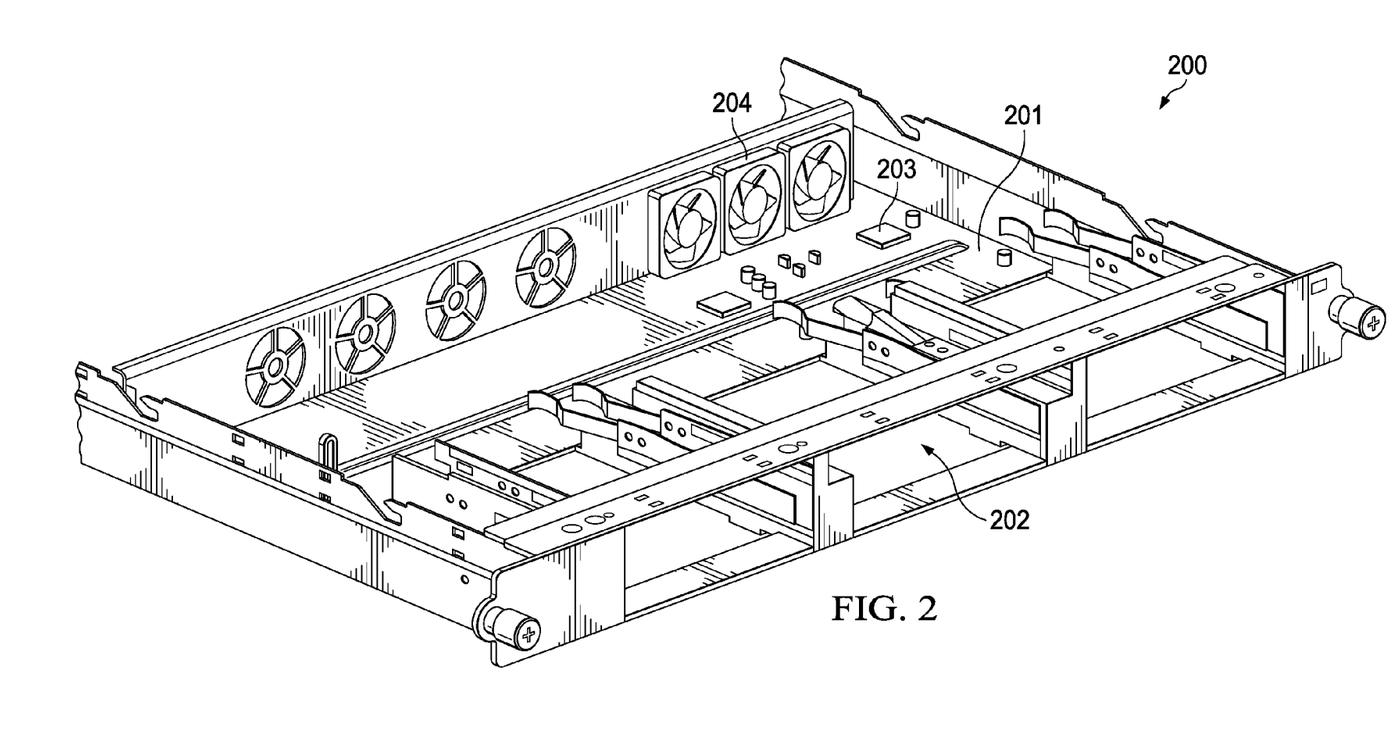
FIG. 2 is a diagram of an example of a chassis and various IHS components according to some embodiments.

FIG. 2 is a diagram of an example of chassis 200 and various IHS components according to some embodiments. One or more hard drive bays 202 are located in the front-end of chassis 200, each configured to receive one or more hard drives (HDDs). The two most common form factors for modern HDDs are 3.5-inch, for desktop computers, and 2.5-inch, primarily for laptops. Accordingly, in many cases, each of hard drive bays 202 may be designed and/or sized to receive a standard-sized HDD.

Chassis 200 also houses IHS 201, itself having a plurality of components 203 (e.g., any of the components shown in IHS 100 of FIG. 1) typically mounted on a motherboard, Printed Circuit Board (PCB), or the like. When inserted into one of hard drive bays 202, an HDD may be connected to IHS 201 using standard connectors, buses, and/or cables such, as PATA (Parallel ATA), SATA (Serial ATA), USB or SAS (Serial attached SCSI).

Fans 204 are assembled and configured to lower the temperature of components 203 during operation, as well as the temperature of any HDDs inserted into hard drive bays 202. In various implementations, one or more of components 203 may be configured to control a speed of fans 204 (e.g. in RPM) using techniques described in connection with FIGS. 7 and 8. It should be noted that chassis 200 is provided by way of example only, and that many other types of chassis housing any type of number of IHSs may used.

Figure 3:
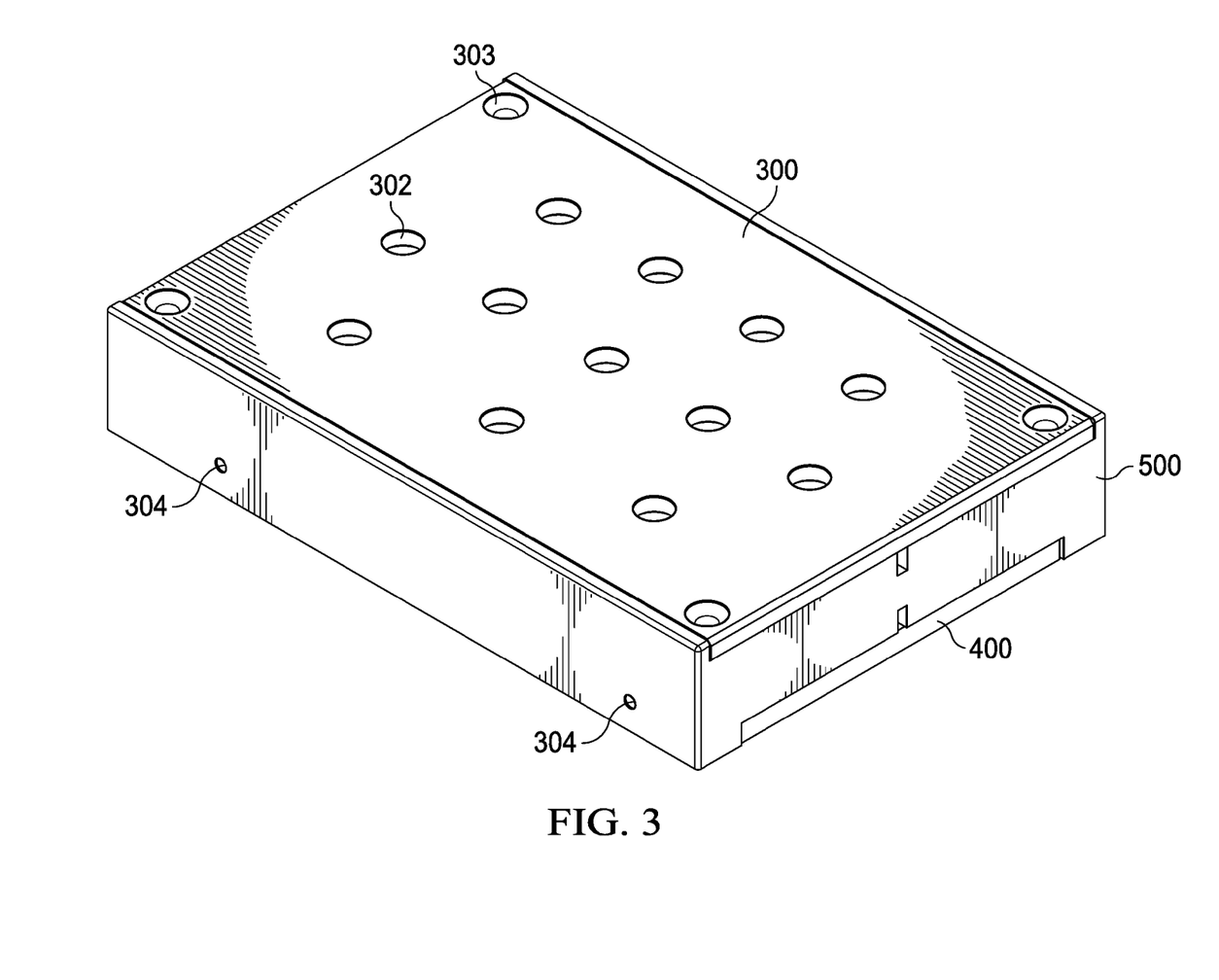
FIG. 3 is a diagram of an example of a top surface of an acoustic hard drive surrogate according to some embodiments.
Figure 4:
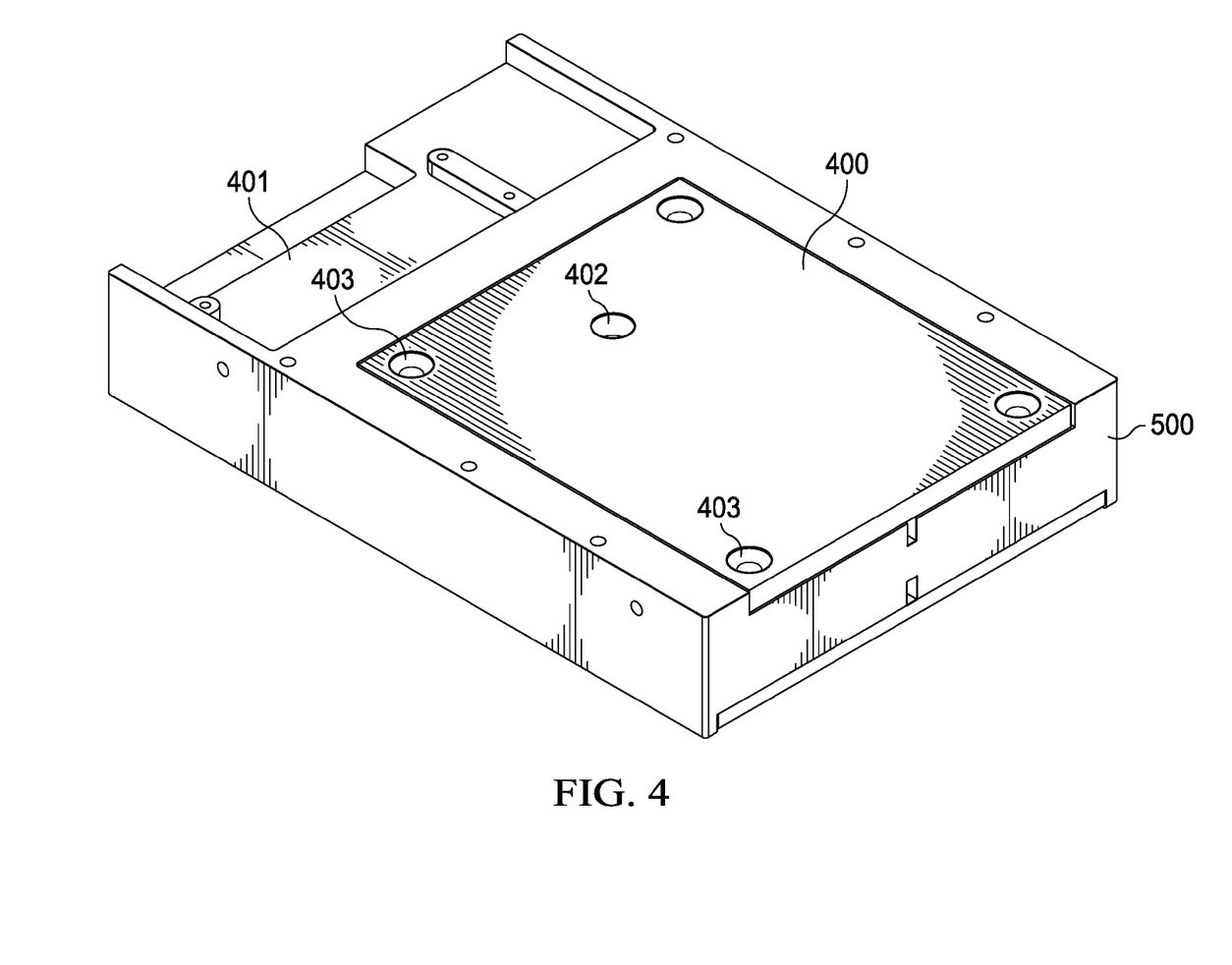
FIG. 4 is a diagram of an example of a bottom surface of an acoustic hard drive surrogate according to some embodiments.
Figure 5:
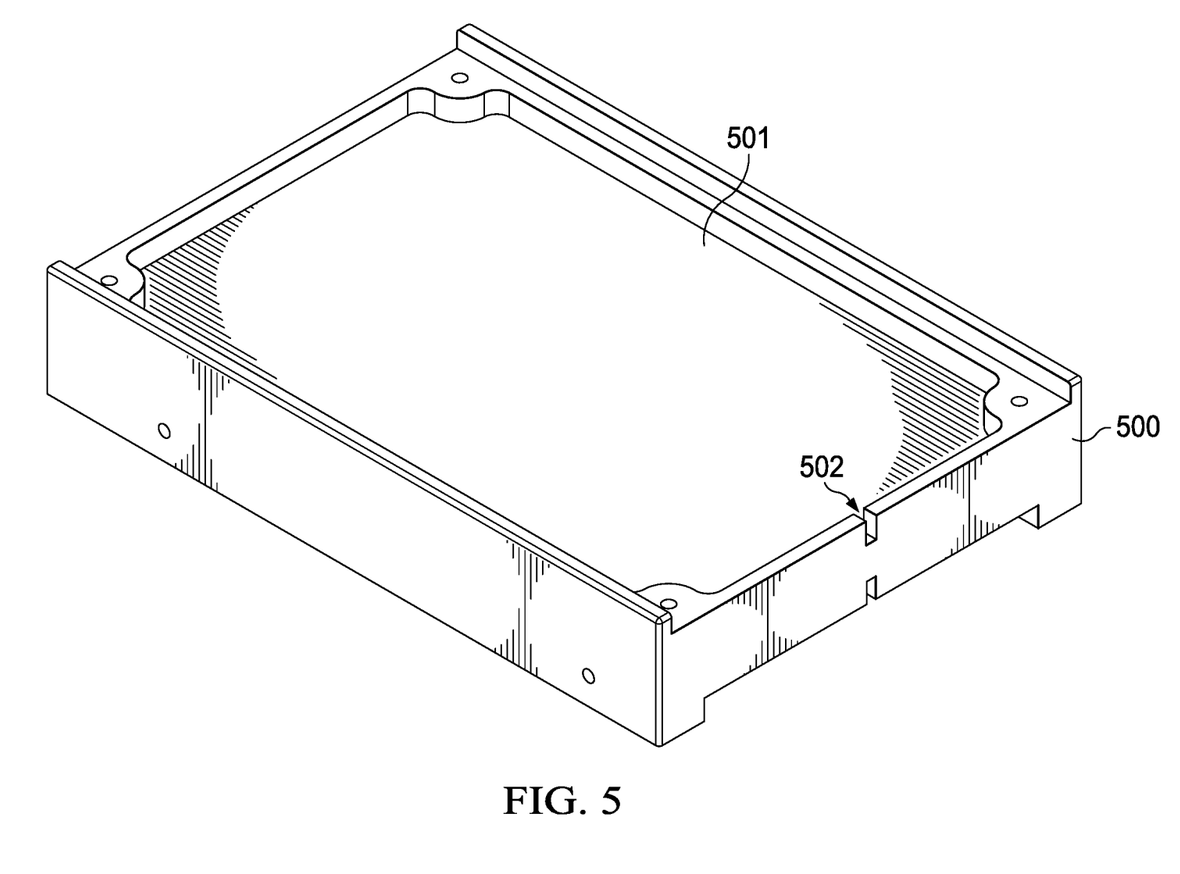
FIG. 5 is a diagram of an example of a cavity of an acoustic hard drive surrogate according to some embodiments.

In various embodiments, an acoustic hard drive surrogate as shown in FIGS. 3-5 may be introduced as a test fixture or tool that uses one or more microphones configured to measure the combined airflow-induced and fan-generated acoustic field experienced inside of hard drive bay 202 along the largest two surfaces (top and bottom) of an HDD, which the surrogate replaces for measurement and characterization procedures. Term "surrogate," as used herein, indicates that the acoustic hard drive surrogate is put in the place of an actual HDD during a testing procedure. The acoustic hard drive surrogate may be optimized to minimize the impact of the tool itself on the measured system, so that both airflow distribution/velocity and acoustic fields mimic what an actual HDD would experience in that location, exclusive of fan-induced vibration carried through the IHS's chassis.

For example, embodiments of the acoustic hard drive surrogate discussed herein may be used to determine how preliminary architecture decisions affect the acoustic field at the hard drive, for research and development in laboratories, to monitor performance, and to test solutions developed to reduce acoustics at the hard drive, as a field test unit to troubleshoot potential HDD issues in the field (e.g., for customers installing high capacity drives), to evaluate a chassis, to address potential acoustic issues in the chassis before burdening production, etc.

In some implementations, an acoustic hard drive surrogate may include one or more of the following features: a metal, plastic, or hybrid metal-plastic assembly of two or more parts, dimensions matching a 3.5" or 2.5" HDD geometry (or another industry standard); a mounting hole pattern that allows for installation into an HDD carrier (another industry standard); a mounting hole pattern for PCB board to be mounted to the surrogate body; a non-powered, mechanically-functional connector that engages with the chassis backplane connector; a hollow body design to allow low-profile microphone to be installed at non-discrete locations on the hard drive surface; a removable cover plate with one or more through-holes used to define the microphone position in the surrogate; a flexible top and bottom cover design that allows the use of a single microphone or multiple microphones during the same recording cycle; and/or mounting holes in top cover are symmetrical about the longitudinal axis and counter-sunk on both sides to allow for installation in two or more configurations.

Additionally or alternatively, the microphone mounting position may place the microphone diaphragm plane parallel to the airflow path along the large surfaces of the hard drive surrogate; plugs may be used to cover unused microphone holes to eliminate air flow or acoustic impact of the hole's presence; one or more servo motors and controller designed to rotate or translate a PCB and cover plate, which enable automated re-positioning of microphones; PCB surface-mounted microphones, accessible through a connector located at the front of the hard drive surrogate; on-board digital signal processing tools (e.g., FPGA chipset(s), filter ICs, logic gates, memory, processing chips, etc.) to process acoustic signals directly inside of the surrogate; USB or other interface for exporting results to a computer; and/or pressure sensors to monitor differential pressure across the drive, to characterize air flow velocity across the drive surface (e.g., to evaluate cooling efficiency for solid-state or drives (SSDs) instead of HDDs).

FIG. 3 is a diagram of an example of top surface 300 of an acoustic hard drive surrogate, according to some embodiments. As shown in FIG. 3, top plate or surface 300 is coupled to surrogate body 500 via fasteners inserted into countersunk holes 303, and it includes one or more microphone holes or circular openings 302 in different positions along top surface 300. Each opening may be sized and/or configured such that a diaphragm of the microphone is parallel to top surface 300. Additionally or alternatively, each opening may be sized and/or configured such that a layer of vibration damping, absorption, and/or isolation component and/or material (e.g., a viscoelastic polymer, elastomer, rubber, foam, etc.) may be disposed between the casing of the microphone and the perimeter or inner surface of the circular opening. Additionally or alternatively, one or more of circular openings 302 may be replaced with a shock mount.

Surrogate body 500 may include one or more lateral mounting holes to allow the surrogate to be coupled to a carrier and/or chassis 500, as if it were an otherwise traditional HDD. Bottom plate or surface 400 is also shown.

FIG. 4 is a diagram of an example of bottom plate or surface 400 of an acoustic hard drive surrogate, according to some embodiments. Particularly, bottom plate or surface 400 includes at least one microphone hole or circular opening 402, and it may be coupled to surrogate body 500 via fasteners inserted into countersunk holes 403. Mock connector 401, located in a rear or back portion of the surrogate, is configured to mimic a connector of an actual HDD, for example, by blocking at least a portion of airflow between the acoustic hard drive surrogate and a PCB within chassis 500 (e.g., a motherboard, a midplane, a backplane, etc.).

FIG. 5 is a diagram of an example of body 500 of an acoustic hard drive surrogate, according to some embodiments. A shown, cavity 501 is configured to accommodate one or more microphones, circuitry, PCB, connectors, wires, etc. within body 500. Body 500 may also include one or more cable passthroughs 502. Additionally or alternatively, cable passthroughs 502 may be replaced with one or more connectors (e.g., USB).

Electronic components and/or sensors within cavity 501 may vary depending upon the degree of implementation desired. For example, in some cases, cavity 501 may remain hollow other than for a microphone and a wire. In other cases, a complete IHS may be deployed within the acoustic hard drive surrogate, and the IHS may be configured to perform various of the techniques discussed herein.

Figure 6:
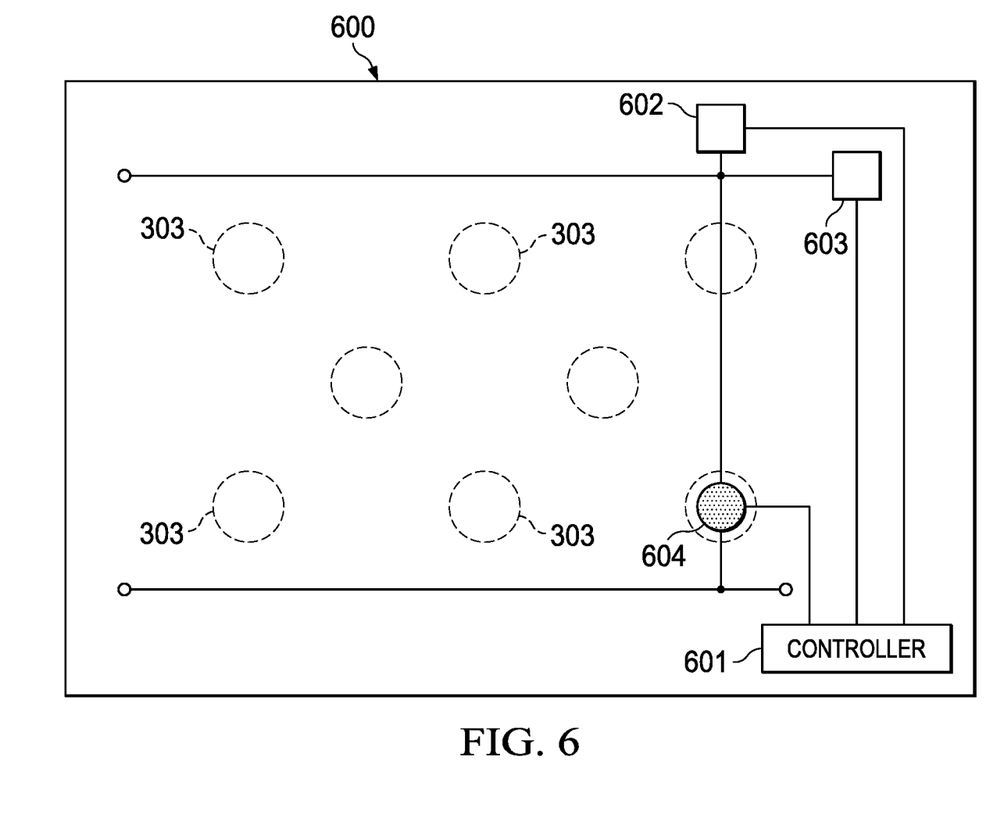
FIG. 6 is a diagram of an example of microphone positioning system for an acoustic hard drive surrogate according to some embodiments.

In yet other cases, microphone positioning system 600 such shown in FIG. 6 may be deployed within cavity 501 according to some embodiments. As shown, controller 601 is coupled to at least one server motor (in this case two) 602 and 603, which may use a two or three dimensional rail and/or pulley system to move microphone 604 in and out of circular openings 303, and/or to translate the microphone between various openings or positions inside cavity 501. Moreover, controller 601 may be configured to perform various other techniques discussed herein, and/or it may be configured to exchange information with another IHS (e.g., via any suitable interface) configured to perform those techniques.

Figure 7:
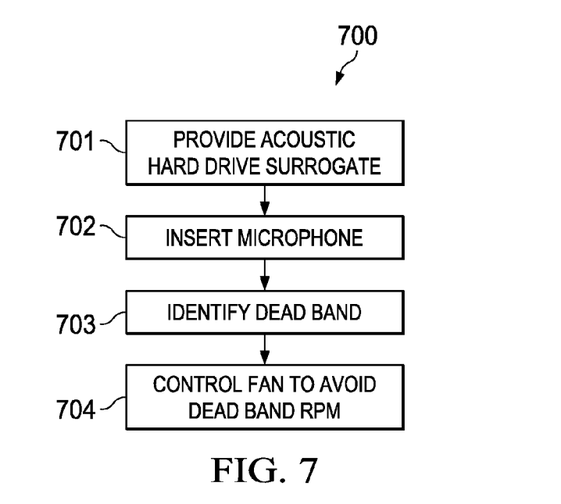
FIG. 7 is a flowchart of an example of a method for using an acoustic hard drive surrogate according to some embodiments.

FIG. 7 is a flowchart of an example of method 700 for using an acoustic hard drive surrogate according to some embodiments. At block 701, method 700 includes providing an acoustic hard drive surrogate, such as depicted in FIGS. 3-5, for example.

At block 702, method 700 includes inserting a microphone into a desired one of circular openings 302 (top plate) or 402 (bottom plate). In some cases, the microphone may be manually moved between different holes. In other cases, positioning system 600 may be used. In each case, a layer of vibration damping material may be used between the microphone and the opening to reduce, prevent, and/or exclude measurement errors that would otherwise be caused by the vibration transmitted to the acoustic hard drive surrogate through chassis 500 itself (rather than over the air).

Still at block 702, method 700 includes taking one or more sound pressure level measurements of a combination of airflow-induced and fan-generated acoustic waves transmitted over the air within chassis 500, exclusive of the aforementioned chassis vibration. These measurements may be taken at any selected one of circular openings 302 over any amount of time sufficient to characterize the acoustic field at that position on the surface of the surrogate.

For example for a first measurement, the microphone may be positioned in one of the circular openings that would be closest to the center of a particular type or size of spinning disk when the surrogate is replacing a particular HDD. A second measurement may be taken after moving the microphone to another position on the surrogate's surface corresponding to the center of the spinning disk of that HDD, for example.

When fewer than all circular openings are being used, one or more plugs may be employed to cover the otherwise opened holes to reduce their interaction with the acoustic field near the surrogate within the chassis. Examples of plugs include, but are not limited to, viscoelastic, rubber or foam cylinders, adhesive tape, etc.

Moreover, these aforementioned sound pressure measurements may be taken with varying environmental conditions such as, for example, different fan 204 speeds (e.g., in RPM). As such, variations in the acoustic field at any given position on the top and/or bottom surfaces of the surrogate may correlated with and/or logged as a function of those conditions (e.g., fan RPM), and then stored in a table, file, or database.

Figure 8:
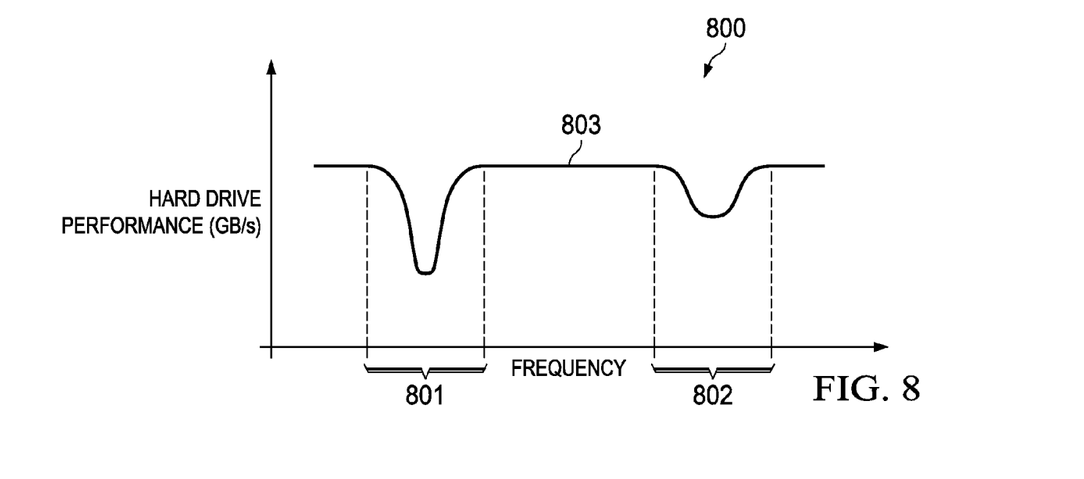
FIG. 8 is a graph of an example of avoidable dead bands according to some embodiments.

At block 703, method 700 includes identifying one or more "dead bands." Examples of dead bands are provided in the example of FIG. 8, where graph 800 shows curve 803 indicative of those bands. In this instance, hard drive performance (e.g., reads or writes in GB/s) dips between frequency bands 801 and 802 in the acoustic spectrum.

With respect to HDD performance, it may be measured using a number of techniques. For example, HDD performance may be measured in IOPS, or I/O Operations Per Second. The total TOPS may be determined with negligible acoustic field (e.g., low fan speeds), and then again at increased fan speed(s). Dividing the IOPS observed under excitation by the TOPS observed at baseline (negligible acoustic field) yields a throughput percentage.

Using the aforementioned correlation, the speed of fans 204 may be controlled at block 704 to avoid generating sound or noise in those frequency bands 801 and 802, for example, by avoiding corresponding those fan speed values in RPM which, in many cases, can be the main source of the sound pressure levels at the selected location in the surrogate's surface.

As described above, the various systems and methods described herein may provide an acoustic hard drive surrogate having one or more of the following features: a hollowed body design to allow low-profile microphones to be installed with the diaphragm flush or slightly recessed from the external hard drive surface, a removable cover plate, with one or more through-holes, used to define the microphone position in the surrogate, a flexible design that allows the use of a single microphone or multiple microphones during the same recording cycle, microphone mounting holes that position the microphone diaphragm plane parallel to the air flow path along the large surfaces of the hard drive, plugs that cover unused microphone holes to eliminate airflow or acoustic impacts of the hole's presence, etc.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a chassis having a hard drive bay; and
an acoustic hard drive surrogate coupled to the hard drive bay, wherein the acoustic hard drive surrogate includes a microphone configured to measure a combined airflow-induced and fan-generated acoustic wave transmitted over the air within the chassis and received at a selected point on a surface of the acoustic hard drive surrogate, and wherein the measurement excludes vibration received by the acoustic hard drive surrogate through the chassis.

2. The IHS of claim 1, wherein the surface is a top surface of the acoustic hard drive surrogate parallel to a bottom surface, wherein the selected point is located at one of a plurality of circular openings on the top surface configured to have the microphone inserted therein, and wherein a diaphragm of the microphone is parallel to the top surface.

3. The IHS of claim 1, wherein the surface is a bottom surface of the acoustic hard drive surrogate parallel to a top surface, wherein the selected point is located at a single circular opening on the bottom surface configured to have the microphone inserted therein, and wherein a diaphragm of the microphone is parallel to the bottom surface.

4. The IHS of claim 2, wherein the acoustic hard drive surrogate includes a connector portion configured to mimic a connector of a hard drive, and wherein the connector blocks at least a portion of airflow between the acoustic hard drive surrogate and a Printed Circuit Board (PCB) within the IHS.

5. The IHS of claim 2, wherein the microphone is separated from a perimeter of the circular opening using a vibration damping component or shock mount.

6. The IHS of claim 2, wherein the acoustic hard drive surrogate includes a hollow body between the top and bottom surfaces configured to hold the microphone.

7. The IHS of claim 6, wherein the microphone is mounted on a Printed Circuit Board (PCB), and wherein the acoustic hard drive surrogate includes a motor coupled to the PCB and configured to move the microphone between different ones of the plurality of circular openings.

8. The IHS of claim 7, wherein the PCB further comprises a controller coupled to the microphone, the controller configured to identify a fan speed at which the acoustic wave causes the acoustic hard drive surrogate to suffer performance degradation, and wherein a fan within the IHS is configured to avoid the identified fan speeds during operation of the IHS.

9. The IHS of claim 8, wherein during a measurement of the acoustic wave, all circular openings other than the circular opening at the selected point are covered.

10. An acoustic hard drive surrogate, comprising:
a top surface;
a bottom surface parallel to the top surface with a cavity between the top and bottom surfaces; and
a plurality of circular openings on at least one of the top or bottom surfaces, wherein the circular openings are configured to have a microphone inserted therein, the microphone configured to measure a combined airflow-induced and fan-generated acoustic wave transmitted over the air within a chassis of an Information Processing System (IHS) and received at the acoustic hard drive surrogate, and wherein the measurement excludes vibration received by the acoustic hard drive surrogate through the chassis.

11. The acoustic hard drive surrogate of claim 10, wherein a diaphragm of the microphone is parallel to the top surface.

12. The acoustic hard drive surrogate of claim 10, further comprising a connector portion configured to mimic a connector of a hard drive, and wherein the connector blocks at least a portion of airflow between the acoustic hard drive surrogate and a Printed Circuit Board (PCB) within the IHS.

13. The acoustic hard drive surrogate of claim 10, wherein the microphone is separated from a perimeter of the circular opening using a vibration damping material.

14. The acoustic hard drive surrogate of claim 10, wherein the microphone is mounted on a Printed Circuit Board (PCB) located within the cavity, and wherein the acoustic hard drive surrogate includes a motor coupled to the PCB and configured to move the microphone between different ones of the plurality of circular openings.

15. The acoustic hard drive surrogate of claim 10, further comprising a controller coupled to the microphone, the controller configured to identify a fan speed at which the acoustic wave causes the acoustic hard drive surrogate to suffer performance degradation, and wherein a fan within the IHS is configured to avoid the identified fan speeds during operation of the IHS.

16. A method, comprising:
providing an acoustic hard drive surrogate comprising a plurality of circular openings on at least one of a top or bottom surface; and
inserting a microphone into one of the circular openings, the microphone configured to measure a combined airflow-induced and fan-generated acoustic wave transmitted over the air within a chassis of an Information Processing System (IHS) and received at the acoustic hard drive surrogate, and wherein the measurement excludes vibration received by the acoustic hard drive surrogate through the chassis.

17. The method of claim 16, further comprising identifying a fan speed at which the acoustic wave causes the acoustic hard drive surrogate to suffer performance degradation.

18. The method of claim 17, further comprising controlling a fan within the IHS to avoid the identified fan speeds during operation of the IHS.

19. The method of claim 16, wherein the acoustic hard drive surrogate comprises a connector portion configured to mimic a connector of a hard drive, and wherein the connector blocks at least a portion of airflow between the acoustic hard drive surrogate and a Printed Circuit Board (PCB) within the IHS.

20. The method of claim 16, wherein the microphone is separated from a perimeter of the circular opening using a damping material.

\* \* \* \* \*